(12) United States Patent
Zhou et al.

(10) Patent No.: US 9,911,061 B2
(45) Date of Patent: Mar. 6, 2018

(54) FAST HISTOGRAM-BASED OBJECT TRACKING

(71) Applicant: Apple Inc., Cupertino, CA (US)

(72) Inventors: Jianping Zhou, Fremont, CA (US); Geoffrey T. Anneheim, San Francisco, CA (US); Xiaoxing Li, San Jose, CA (US); Benjamin M. Olson, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 306 days.

(21) Appl. No.: 14/869,732

(22) Filed: Sep. 29, 2015

(65) Prior Publication Data

US 2016/0358340 A1    Dec. 8, 2016

Related U.S. Application Data

(60) Provisional application No. 62/172,135, filed on Jun. 7, 2015.

(51) Int. Cl.
   *G06K 9/52* (2006.01)
   *G06K 9/46* (2006.01)
   *G06T 7/246* (2017.01)

(52) U.S. Cl.
   CPC ............ *G06K 9/52* (2013.01); *G06K 9/4642* (2013.01); *G06K 9/4661* (2013.01); *G06K 9/4671* (2013.01); *G06T 7/248* (2017.01); *G06K 2009/4666* (2013.01); *G06T 2207/10016* (2013.01)

(58) Field of Classification Search
   CPC ....................................................... G06K 9/52
   See application file for complete search history.

(56) References Cited

U.S. PATENT DOCUMENTS

| | | | | |
|---|---|---|---|---|
| 6,724,915 B1* | 4/2004 | Toklu | ............... | G06T 7/248 |
| | | | | 382/103 |
| 7,826,660 B2* | 11/2010 | Saquib | ............... | H04N 1/4072 |
| | | | | 382/167 |
| 8,345,102 B2 | 1/2013 | Huang | | |
| 8,611,591 B2* | 12/2013 | Coffman | ............... | G06T 7/277 |
| | | | | 382/103 |
| 9,773,192 B2* | 9/2017 | Li | ............... | G06K 9/6202 |

(Continued)

OTHER PUBLICATIONS

Comaniciu, et al., "Kernel-Based Object Tracking," IEEE Transactions on Pattern Analysis and Machine Intelligence, vol. 25, Issue: 5, May 2003.

*Primary Examiner* — James Pontius
(74) *Attorney, Agent, or Firm* — Blank Rome LLP

(57) ABSTRACT

Systems, methods, and computer readable media to rapidly identify and track an arbitrary sized object through a temporal sequence of frames is described. The object being tracked may initially be identified via a specified or otherwise known region-of-interest (ROI). A portion of that ROI can be used to generate an initial or reference histogram and luminosity measure, metrics that may be used to identify the ROI in a subsequent frame. For a frame subsequent to the initial or reference frame, a series of putative ROIs (each having its own location and size) may be identified and the "best" of the identified ROIs selected. As used here, the term "best" simply means that the more similar two frames' histograms and luminosity measures are, the better one is with respect to the other.

24 Claims, 6 Drawing Sheets

(56) References Cited

U.S. PATENT DOCUMENTS

| | | | |
|---|---|---|---|
| 2006/0083428 A1* | 4/2006 | Ghosh | B60R 13/10 |
| | | | 382/224 |
| 2006/0204113 A1 | 9/2006 | Wang | |
| 2009/0303342 A1* | 12/2009 | Corcoran | G06K 9/00228 |
| | | | 348/222.1 |
| 2012/0249726 A1 | 10/2012 | Corcoran | |
| 2015/0117540 A1 | 4/2015 | Morimoto | |
| 2016/0358341 A1* | 12/2016 | Li | G06T 3/40 |

* cited by examiner

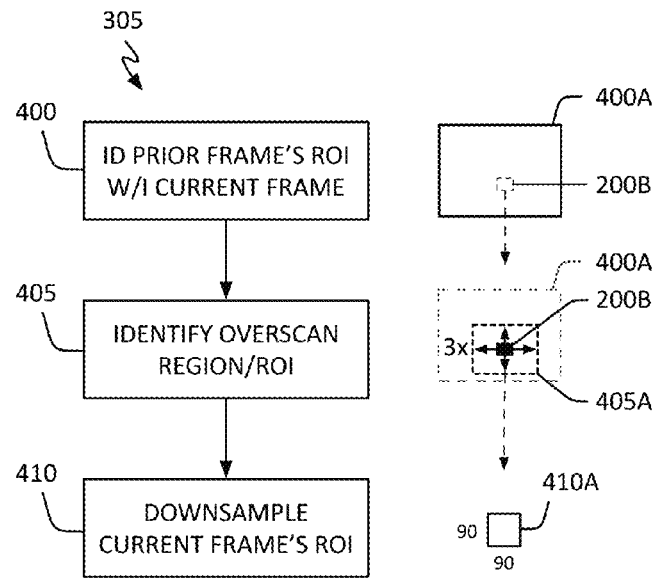
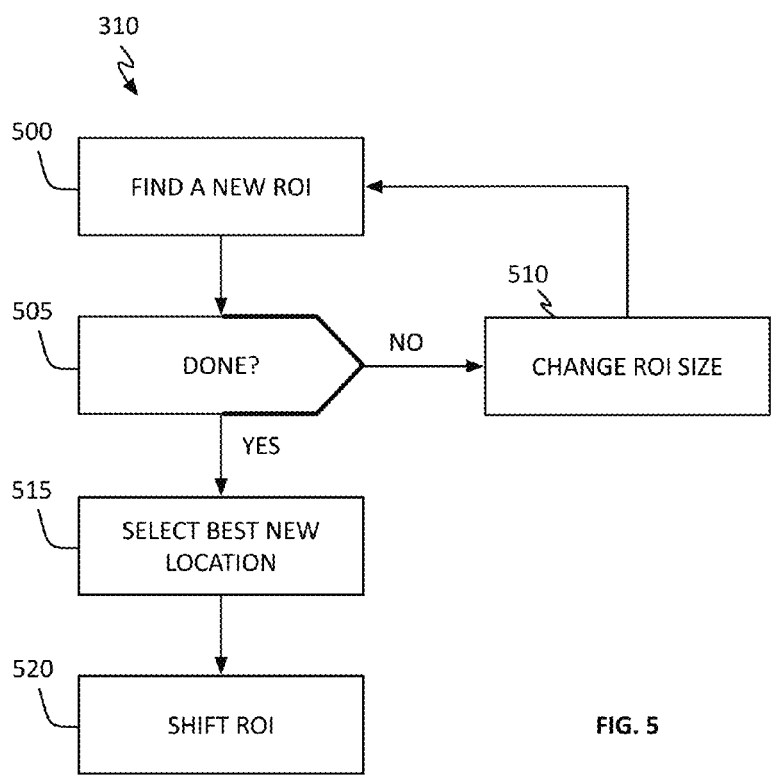
FIG. 4
FIG. 5

FAST HISTOGRAM-BASED OBJECT TRACKING

BACKGROUND

This disclosure relates generally to the field of computer vision and video processing. More particularly, but not by way of limitation, this disclosure relates to a technique for tracking an initially defined region-of-interest (ROI) through a sequence of frames or images using a small template. While the term "frame" is generally used when describing a temporal sequence of images (e.g., video), the terms "image" and "frame" are taken herein to mean the same thing: a two-dimensional arrangement of pixels.

The ability to track a moving object or an arbitrarily sized ROI through a sequence of frames is important for many image analysis tasks such as, for example, dynamic auto-focus and/or auto-exposure operations. Tracking a region-of-interest between and over many frames in a sequence of frames requires that the region's representation be invariant, or invariant enough, to cope with the inherent changes due to object movement and/or camera movement (e.g., translation, rotation and occlusion). Further, any such operations must be able to take place in real-time, during image capture. Current technology does not provide adequate solutions to these issues in many instances.

SUMMARY

In one embodiment the disclosed concepts provide a method to track an object through a sequence of frames or images. The method includes receiving an has an initial region-of-interest (ROI) which in turn has an initial location and an initial size. Next, an initial histogram may be determined and an initial luminance measure that is based on the initial ROI. Next, a first frame may be received from the temporal sequence of frames (where the first frame arrives later in the temporal sequence of frames than the initial frame). This may be followed by determining a plurality of putative ROIs for the first frame, each of which may be based on the initial histogram and the initial luminance measure and then determining a plurality of quality metric values, each of which may correspond to a different one of the putative ROIs. One of the putative ROIs may then be selected as a first ROI for the first frame based on the quality metric values. The method concludes by obtaining a first histogram and a first luminance measure based on the first ROI, receiving a next frame from the temporal sequence of frames (where the next frame arrives later in the temporal sequence of frames than the first frame); and determining a next ROI of the next frame based on the first ROI, the first histogram, and the first luminance measure. A computer executable program to implement the method may be stored in any media that is readable and executable by a computer system.

BRIEF DESCRIPTION OF THE DRAWINGS

FIG. 4 shows, in flowchart form, an initial region-of-interest (ROI) identification operation in accordance with one embodiment.

FIG. 5 shows, in flowchart form, an operation to identify a "best" new ROI in accordance with one embodiment.

DETAILED DESCRIPTION

This disclosure pertains to systems, methods, and computer readable media to rapidly identify and track an arbitrary sized object through a temporal sequence of frames such as may be captured during a camera's video and burst-mode capture operations. The object being tracked may initially be identified via a specified or otherwise known region-of-interest (ROI). A portion of that ROI can be used to generate an initial or reference histogram and luminosity measure, metrics that may be used to identify the ROI in a subsequent frame. For a frame subsequent to the initial or reference frame, a series of putative ROIs (each having its own location and size) may be identified and the "best" of the identified ROIs selected. As used herein, the term "best" simply means that the more similar two frames' histograms and luminosity measures are, the better one is with respect to the other.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of image analysis and object tracking systems having the benefit of this disclosure.

Figure 1:
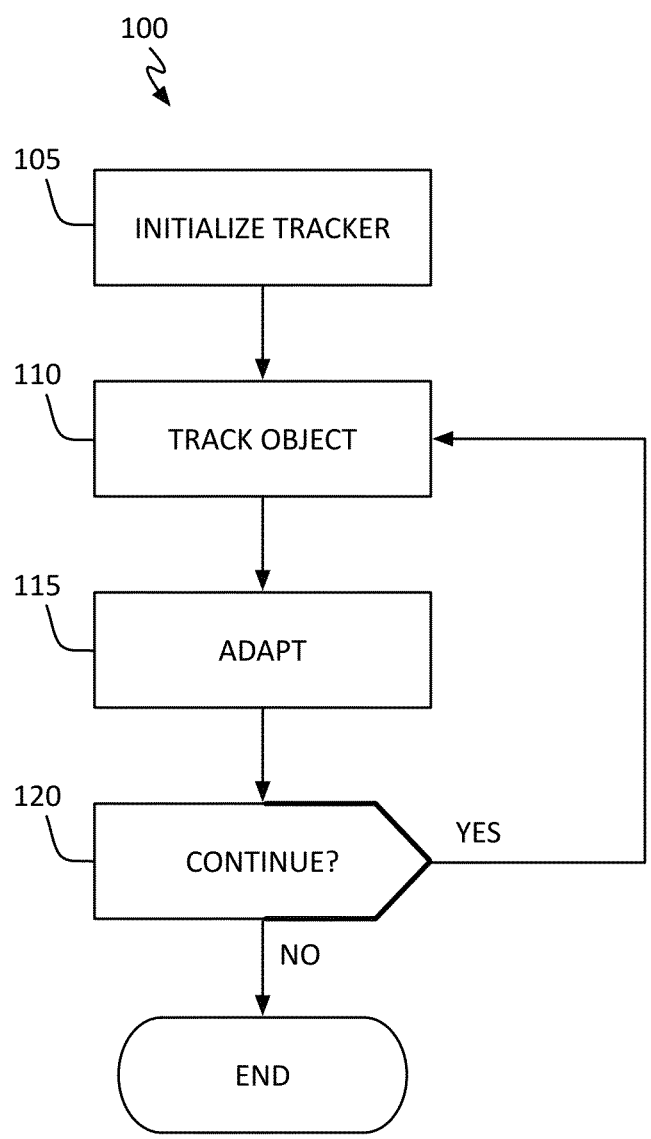
FIG. 1 shows, in flowchart form, operation of an object tracking system in accordance with one embodiment.

Referring to FIG. 1, object tracking system operation 100 in accordance with this disclosure may initialize itself by acquiring an initialization or reference frame from a temporal sequence of frames. The reference frame, and its given ROI, may be used to determine a reference histogram and one or more luminosity measures (block 105). For example, the given ROI may be identified by the location of its centroid and its vertical and horizontal extent within a frame. From that point forward, the region identified by the initial ROI may be followed (tracked) through succeeding frames by updating the ROI (block 110). As illustrated, the ROIs identified in accordance with block 110 may be updated or adapted over time (block 115), where after a check may be performed to determine if tracking is to be continued (block 120). If ROI tracking is to be continued (the "YES" prong of block 120), operation 100 continues at block 110, otherwise it may be terminated (the "NO" prong of block 120).

Figure 2:
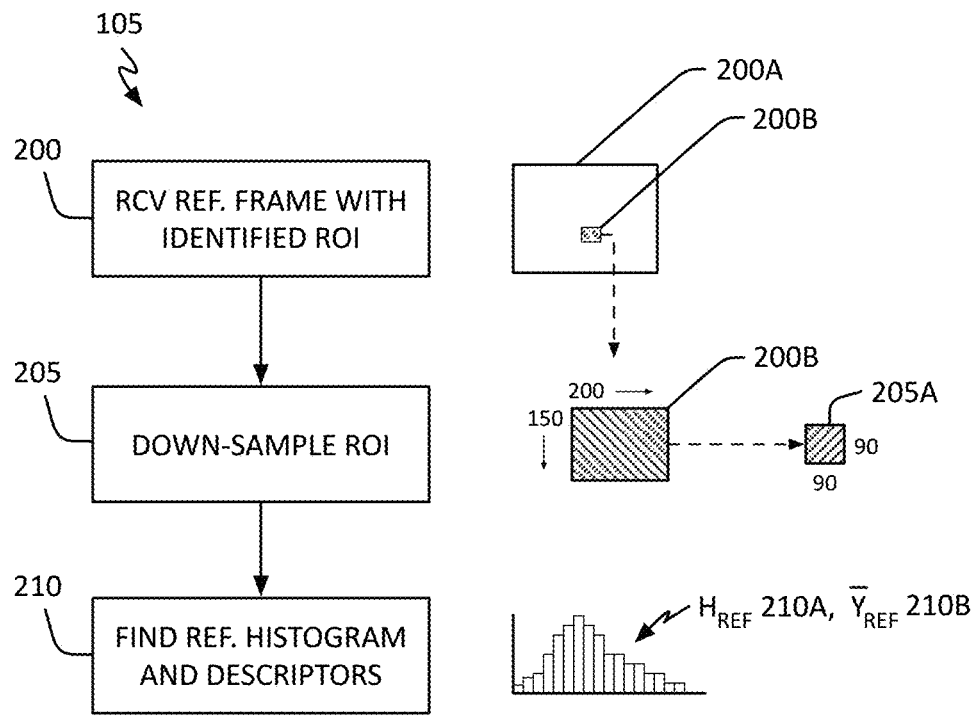
FIG. 2 shows, in flowchart form, an object tracking system initialization operation in accordance with one embodiment.

Referring to FIG. 2, initialization operation in accordance with one embodiment of block 105 may begin by obtaining an initialization or reference frame having an identified ROI (block 200), e.g., reference frame 200A having ROI 200B. The reference frame's ROI may be obtained in any way desired using any available technology, technique, method or process. Next, the identified ROI may be down-sampled to a specified or standard size (block 205), e.g., from 200×150 pixel region 200B to 90×90 pixel region 205A. The down-sampled ROI region may be used to generate a reference histogram $H_{REF}$ and a reference luminance measure $\overline{Y}_{REF}$ (block 210), e.g., histogram 210A and measure 210B. By way of example, reference histogram $H_{REF}$ could be a 3-dimensional color histogram (e.g., RGB, YUV, HSV) or a 1-dimensional hue histogram. Reference luminance measure $\overline{Y}_{REF}$ could be the mean or median luminosity or some other statistical value relevant to a particular implementation.

Figure 3:
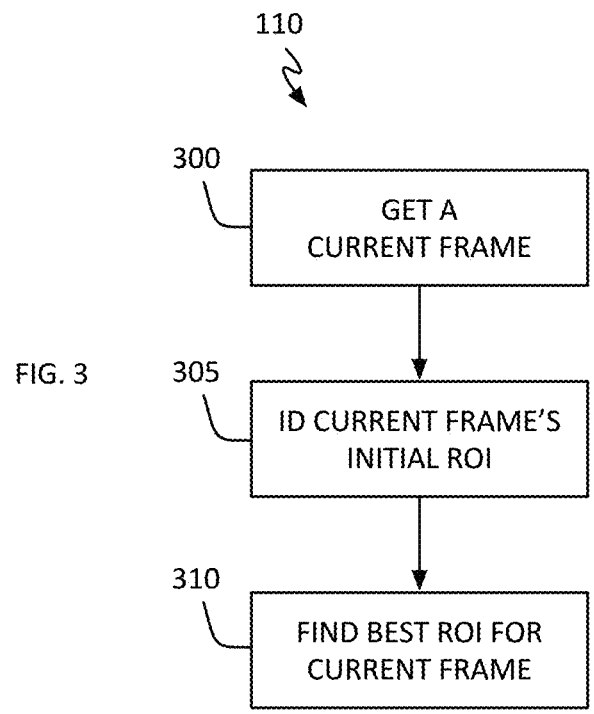
FIG. 3 shows, in flowchart form, an object tracking operation in accordance with one embodiment.

Referring to FIG. 3, tracking operation in accordance with one embodiment of block 110 may begin by obtaining a "current" frame from the temporal sequence of frames (block 300). In one embodiment, every frame in a temporal sequence of frames may be analyzed in accordance with operation 100. In another embodiment, every other frame, or every nth frame, may be analyzed. In yet another embodiment, sequential frames may be analyzed at times or for periods of time and non-sequential frames may be analyzed at other times or for other periods of time. Once acquired, an initial ROI search region for the current frame may be determined (block 305). Based on this initial ROI search region and the reference histogram $H_{REF}$ and reference luminance measure $\overline{Y}_{REF}$, a new "best" ROI for the current frame may be found (block 310). In one embodiment, an ROI determined in accordance with block 310 identifies both a new best location and a new best size. In another embodiment, an ROI determined in accordance with block 310 identifies a new best location while using a fixed size. As used herein, the term "best" simply refers to the calculated quantity meeting some specified criteria (see below).

Referring to FIG. 4, a current frame's initial ROI search region may be found in accordance with one embodiment of block 305 by first identifying where in the current frame the previously processed frame's ROI is located (block 400), identifying an overscan or the search region about that location (block 405), and then down-sampling the identified region to a specified or standard size (block 410). Again by way of example, reference frame ROI 200B may be located within current frame 400A and used to define overscan region 405A which may also be taken as the current frame's initial ROI search region 405A. In one embodiment, the current frame's ROI search region may be 2× or 3× the size of the reference frame's ROI so that if the reference frame's ROI is a region 200×150 pixels centered at location (a, b), the current frame's initial ROI search region could be 500×400 pixels or 600×550 pixels centered about location (a, b). Once identified, the current frame's ROI search region may be down-sampled to a specified or standard size, for example, 90×90 pixel region 410A.

Referring to FIG. 5, operation 310 to find a best ROI for the current frame may begin by first finding a new best location for the current frame's current ROI's size (block 500). A check may then be made to determine if the newly found ROI's location and size satisfy a given criteria (block 505). In one embodiment this criteria could be whether the new ROI's location is within a specified distance of the last determined location (e.g., within j pixels). In another embodiment this criteria could be whether operations in accordance with block 500 have been performed at least, or no more than, a specified number of times (e.g., 3 to 10). In still another embodiment, a quality metric for the newly determined ROI may need to be at least, or no greater than, a given value, or within a specified band of values. In yet another embodiment, any combination of these metrics or other metrics may be used. If the criteria is not met (the "NO" prong of block 505), the current ROI's size may be changed (block 510) where after operation 310 continues at block 500. In one embodiment, the ROI size may be changed a specified number of times (e.g., 3 or some other small number). For example, a first ROI size may be equal to the size of the last analyzed frame (e.g., reference frame 200B), a second size could be 90% of this first size, and a third size could be 110% of the first size. If, on the other hand, the criteria is met (the "YES" prong of block 505), the best overall ROI generated in accordance with blocks 500-510 may be selected (block 515). In one embodiment each ROI determined in accordance with blocks 500-510 may have an associated score so that actions in accordance with block 515 may be the selection of that ROI having the highest score (or combined score should a single ROI have a first score associated with its location and a second score associated with its size). Once selected, the current frame's ROI may be adjusted or shifted in accordance with the selected best ROI accordingly (block 520).

Figure 6:
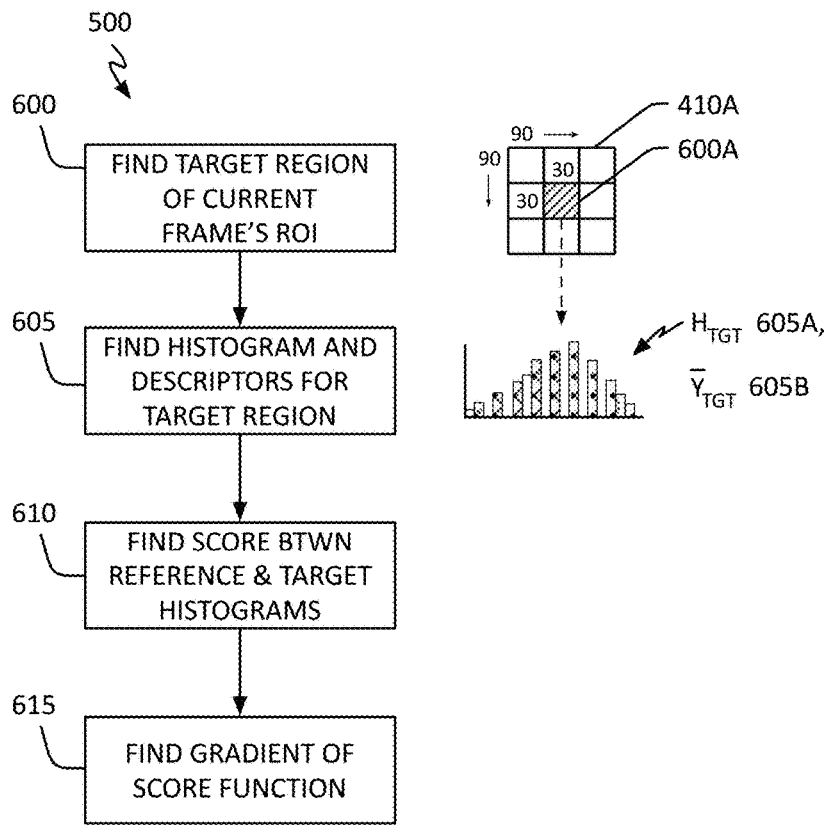
FIG. 6 shows, in flowchart form, an ROI location operation in accordance with one embodiment.

Referring now to FIG. 6, finding a new ROI in accordance with block 500 may begin by first identifying a target region in the current frame's overscaned and down-sampled ROI (block 600), e.g., region 600A from within overscaned and down-sampled ROI 410A. In one embodiment, the target region comprises a portion of the current frame's overscaned and down-sampled ROI corresponding to the inverse of the amount of overscan applied during actions in accordance with block 405. By way of example, if the current frame's overscaned and down-sampled ROI 410A is a 90×90 pixel region, and the overscan factor applied during block 405 was 3×, target region 600A may consist of the central one-third (⅓) of the current frame's overscaned and down-sampled ROI 410A (e.g., a 30×30 pixel region). If the current frame's overscaned and down-sampled ROI 410A is a 90×90 pixel region, and the overscan factor applied during block 405 was 5×, target region 600A may consist of the central one-fifth (⅕) of the current frame's overscaned and down-sampled ROI 410A (e.g., an 18×18 pixel region). From the identified target region, a target histogram $H_{TGT}$ and target luminance measure $\overline{Y}_{TGT}$ may be found (block 605), e.g., 605A and 605B.

In one embodiment, target histogram $H_{TGT}$ and target luminosity measure $\overline{Y}_{TGT}$ may be determined directly from the values of the target region's pixels. In another embodiment luminance adaption or normalization may be applied to the pixel values prior to determining either target histogram $H_{TGT}$ or target luminosity measure $\overline{Y}_{TGT}$ in accordance with the following.

1. Find the R, G and B values for each pixel in target region.
2. Find the mean luminance of the pixels found in (1), $\overline{Y}_{TGT}^{RAW}$.
3. For each pixel found in (1), find its corresponding luminance adapted or normalized R, G and B values as shown here:

$$R' = \frac{\overline{Y}_{REF}}{\overline{Y}_{TGT}^{RAW}} R, \qquad \text{EQ. 1}$$

$$G' = \frac{\overline{Y}_{REF}}{\overline{Y}_{TGT}^{RAW}} G,$$

$$B' = \frac{\overline{Y}_{REF}}{\overline{Y}_{TGT}^{RAW}} B,$$

where R, G and B represent pixel values as determined in (1) above; R', G' and B' represent luminance adapted or normalized values for those same pixels; and $\overline{Y}_{REF}$ and $\overline{Y}_{TGT}^{RAW}$ are as defined above.

4. Using R', G' and B' values, determine the target region's luminance adapted histogram $H_{TGT}$ and mean luminosity $\overline{Y}_{TGT}$.

With reference and target histograms $H_{REF}$ and $H_{TGT}$ known, a score indicative of their difference (or similarity) may be found (block 610). In general, a scoring function may be any function that monotonically increases (or decreases) as the difference between the two histograms increases. In one embodiment, the reference and target histograms may be normalized prior to score determination. In one embodiment, this may be done as follows:

$$\hat{H}_{REF}(i) = \frac{H_{REF}(i)}{\sum_{i=1}^{N} H_{REF}(i)} \quad \text{and} \qquad \text{EQ. 2A}$$

$$\hat{H}_{TGT}(i) = \frac{H_{TGT}(i)}{\sum_{i=1}^{N} H_{TGT}(i)}, \qquad \text{EQ. 2B}$$

where $\hat{H}_{REF}(i)$ and $\hat{H}_{TGT}(i)$ represent the normalized reference and target histogram values for the ith element, and N represents the number of histogram bins in each histogram. Based on these normalized histogram values, a score function in accordance with one embodiment is:

$$\text{score} = \sum_{i=1}^{N} \sqrt{\hat{H}_{REF}(i) \times \hat{H}_{TGT}(i)}, \qquad \text{EQ. 3}$$

where $\hat{H}_{REF}(i)$, $\hat{H}_{TGT}(i)$, and N are as defined above.

For a given score function (e.g., via EQ. 3), the gradient at the current location may be defined (block 615). For example, the gradient of the score function identified in EQ. 3 at a given location within the current frame's ROI may be given as follows:

$$\text{weight} = \sum_{i=1:width, j=1:height} \sqrt{\hat{H}_{REF}(bin(i,j))/\hat{H}_{TGT}(bin(i,j))}, \qquad \text{EQ. 4A}$$

$$\text{shift\_x} = \sum_{i=1:width, j=1:height} \frac{i \times \sqrt{\hat{H}_{REF}(bin(i,j))/\hat{H}_{TGT}(bin(i,j))}}{\text{weight}}, \qquad \text{EQ. 4B}$$

and $$\text{shift\_j} = \sum_{i=1:width, j=1:height} \frac{j \times \sqrt{\hat{H}_{REF}(bin(i,j))/\hat{H}_{TGT}(bin(i,j))}}{\text{weight}}, \qquad \text{EQ. 4C}$$

where bin(i, j) represents an index into the reference and target histograms corresponding to a pixel at location (i, j) within the current frame's current ROI, width represents the width of the current frame's current ROI, height represents the height of the current frame's current ROI, shift_x represents the amount to shift the current frame's current ROI along the ROI's 'x' axis, and shift_j represents the amount to shift the current frame's current ROI along the ROI's y' axis (assuming a standard Cartesian coordinate system for a two-dimensional ROI).

It should be noted, one goal of actions in accordance with block 615 is to identify that pixel position within the current frame's overscaned and down-sampled ROI that maximizes EQ. 3. One approach to doing this is via a gradient descent method such as that illustrated by EQ. 4. Another approach would be to perform an exhaustive search over all possible pixel locations within the current frame's overscaned and down-sampled ROI. For example, if the current and reference frames' overscaned and down-sampled ROIs are each 90×90 pixels, this approach would require 8,100 iterations. The gradient descent approach can be used to significantly reduce the number of such calculations needed to identify a maximum or best value.

Referring again to FIG. 5 at block 515, in an implementation such as that described above selecting a best new ROI location can resolve down to selecting the location corresponding to the peak score value of the collection of values determined in accordance with blocks 500-510. If there is more than one peak, a heuristic may be used to select which one to use. For example, always selecting the largest value may cause tracking to be discontinuous or "jerky" from frame to frame, whereas selecting that peak closest to the current ROI location may, while not being the optimal location, provide the smoothest tracking results. In another embodiment, the largest peak may always be selected. In still another embodiment, a combination of two or more peaks may be used (e.g., an interpolated value). In this latter case, a value for $\overline{Y}_{REF}$ may also be interpolated. With the new ROI's location (e.g., centroid) chosen, when a next frame from the temporal sequence of frames is selected for processing becoming the "current" frame, the selected ROI may serve as the "reference" frame. With the shift values known (e.g., in accordance with EQ. 4), the centroid of the current ROI may be shifted shift_x pixels in the x direction and shift_j pixels in they direction (block 520).

Figure 7:
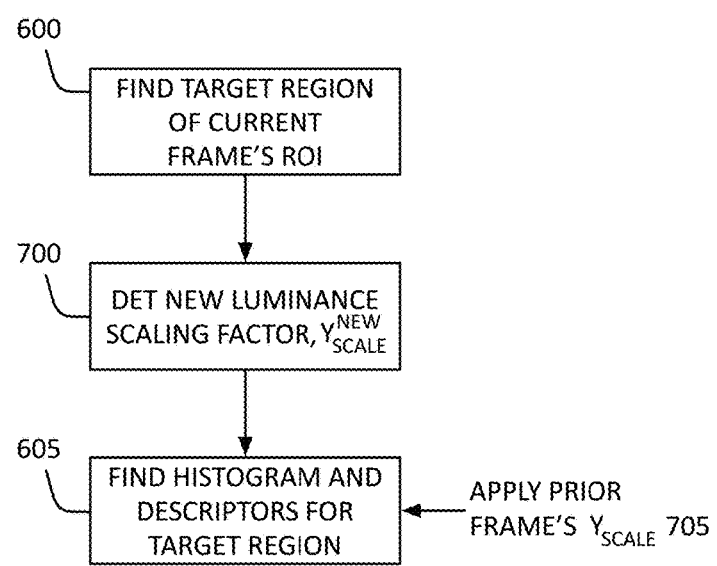
FIG. 7 shows, in flowchart form, an object tracking adaptation or update operation in accordance with one embodiment.

Referring to FIG. 7, in one embodiment a new luminance scaling factor may be determined after acts in accordance with block 600 and before actions in accordance with block 605 (block 700). The luminance scaling factor may be used to compensate for the frame-to-frame change in brightness so that if the overall scene (as reflected in the current ROI) has gotten darker the luminance scaling factor will increase and visa versa. In one embodiment, a luminance scaling factor may be defined as follows:

$$Y_{SCALE}^{NEW}=(1-\omega)Y_{SCALE}+\omega(\overline{Y}_{REF}/\overline{Y}_{TGT}), \quad \text{EQ. 5}$$

where $Y_{SCALE}^{NEW}$ represents the updated or new value of the scaling factor, $Y_{SCALE}$ represents the current scaling factor's value, ω represents a form of "confidence" and may be based on the movement and/or scaling of the ROI between the current and previous frames so that ω is small (or large) when there is large relative movement between the two frames and large (or small) when there is little relative movement between the two frames. By way of example only, ω may be determined as follows:

$$\text{Relative\_position\_change} = \sqrt{\frac{((\Delta x)^2 + (\Delta y)^2)}{(iWidth^2 + iHeight^2)}} \quad \text{EQ. 6}$$

where Δx and Δy represent the magnitude of the change in the ROI's x and y position after actions in accordance with block 520 (e.g., (new_x_position–old_x_position) and (new_y_position–old_y_position)), iWidth represents the image's width and iHeight represents the image's height. In one embodiment:

If (relative_position_change)>0.04, then ω=0; and
  otherwise ω=0.04–(relative_position_change), EQ. 7 where the limit value 0.04 may be empirically determined to suit the needs of a particular implementation. In practice, ω may be set to 1.0 for the first frame (e.g., reference frame 200A), calculated for each frame processed in accordance with operation 100 and applied during acts in accordance with block 115. More specifically and referring again to FIG. 7, an updated luminance scaling factor may be applied during acts in accordance with block 605, where luminance scaling factor $Y_{SCALE}$ 705 represents the value of the scaling factor as determined in the prior frame (i.e., not the current frame). This means the luminance scaling factor $Y_{SCALE}^{NEW}$ determined in accordance with block 700 is not applied until the next frame is analyzed. With respect to operations in accordance with block 605, in one embodiment luminance scaling factor $Y_{SCALE}$ 705 may be applied as follows:

$$R_{SCALE}=(R \times Y_{SCALE}),$$

$$G_{SCALE}=(G \times Y_{SCALE}), \text{ and}$$

$$B_{SCALE}=(B \times Y_{SCALE}) \quad \text{EQ. 8}$$

Here, R, G and B represent the original RGB values. With values in accordance with EQ. 8 known, luminance (adapted and) scaled RGB values ($R_{SCALE}$, $G_{SCALE}$, $B_{SCALE}$) may be used to determine the current frame's target histogram $H_{TGT}$ and target luminosity measure $\overline{Y}_{TGT}$ values. It is noted again, luminance scaling factor $Y_{SCALE}$ 705 is the prior frame's scaling factor determined in accordance with EQ. 8.

Figure 8:
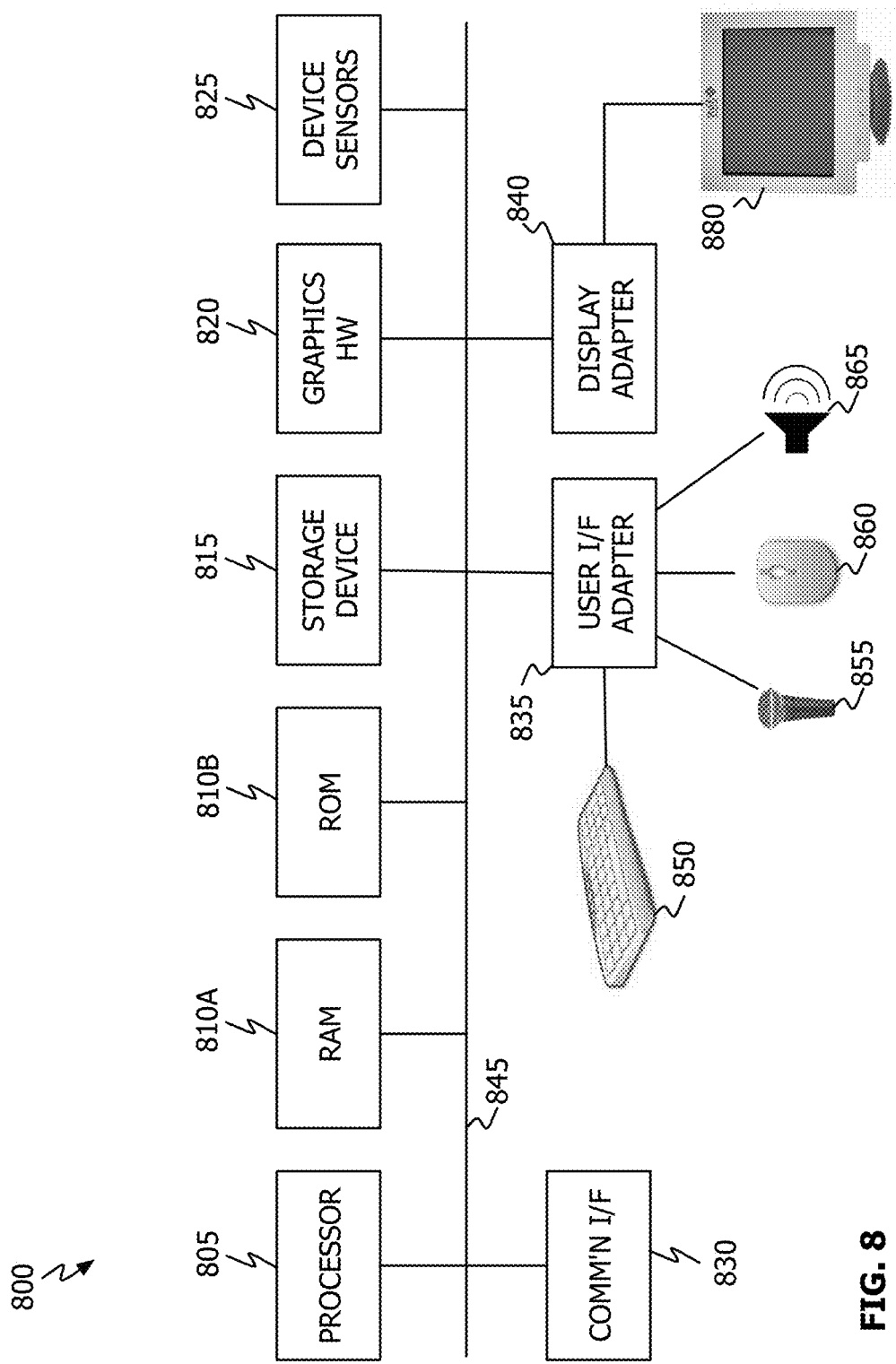
FIG. 8 shows, in block diagram form, a computer system in accordance with one embodiment.

Referring to FIG. 8, the disclosed embodiments of an object tracking operation in accordance with the above may be performed by representative computer system 800 (e.g., a general purpose computer system such as a desktop, laptop, notebook or tablet computer system). Computer system 800 may include one or more processors 805, memory 810 (810A and 810B), one or more storage devices 815, graphics hardware 820, device sensors 825 (e.g., 3D depth sensor, proximity sensor, ambient light sensor, accelerometer and/or gyroscope), communication interface 830, user interface adapter 835 and display adapter 840—all of which may be coupled via system bus or backplane 845 which may be comprised of one or more continuous (as shown) or discontinuous communication links. Memory 810 may include one or more different types of media (typically solid-state) used by processor 805 and graphics hardware 820. For example, memory 810 may include memory cache, read-only memory (ROM), and/or random access memory (RAM). Storage 815 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 810 and storage 815 may be used to retain media (e.g., audio, image and video files), preference information, device profile information, computer program instructions or code organized into one or more modules and written in any desired computer programming language, and any other suitable data. When executed by processor(S) 805 and/or graphics hardware 820 such computer program code may implement one or more of the methods described herein. Communication interface 830 may be used to connect computer system 800 to one or more networks. Illustrative networks include, but are not limited to, a local network such as a USB network, an organization's local area network, and a wide area network such as the Internet. Communication interface 830 may use any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), and Internet Message Access Protocol (IMAP)). User interface adapter 835 may be used to connect keyboard 850, microphone 855, pointer device 860, speaker 865 and other user interface devices such as a touch-pad and/or a touch screen (not shown). Display adapter 840 may be used to connect one or more display units 870 which may provide touch input capability. Processor 805 may be a system-on-chip such as those found in mobile devices and include one or more dedicated graphics processing units (GPUs). Processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 perform computational tasks. In one embodiment, graphics hardware 820 may include one or more programmable GPUs and each such unit may include one or more processing cores.

Figure 9:
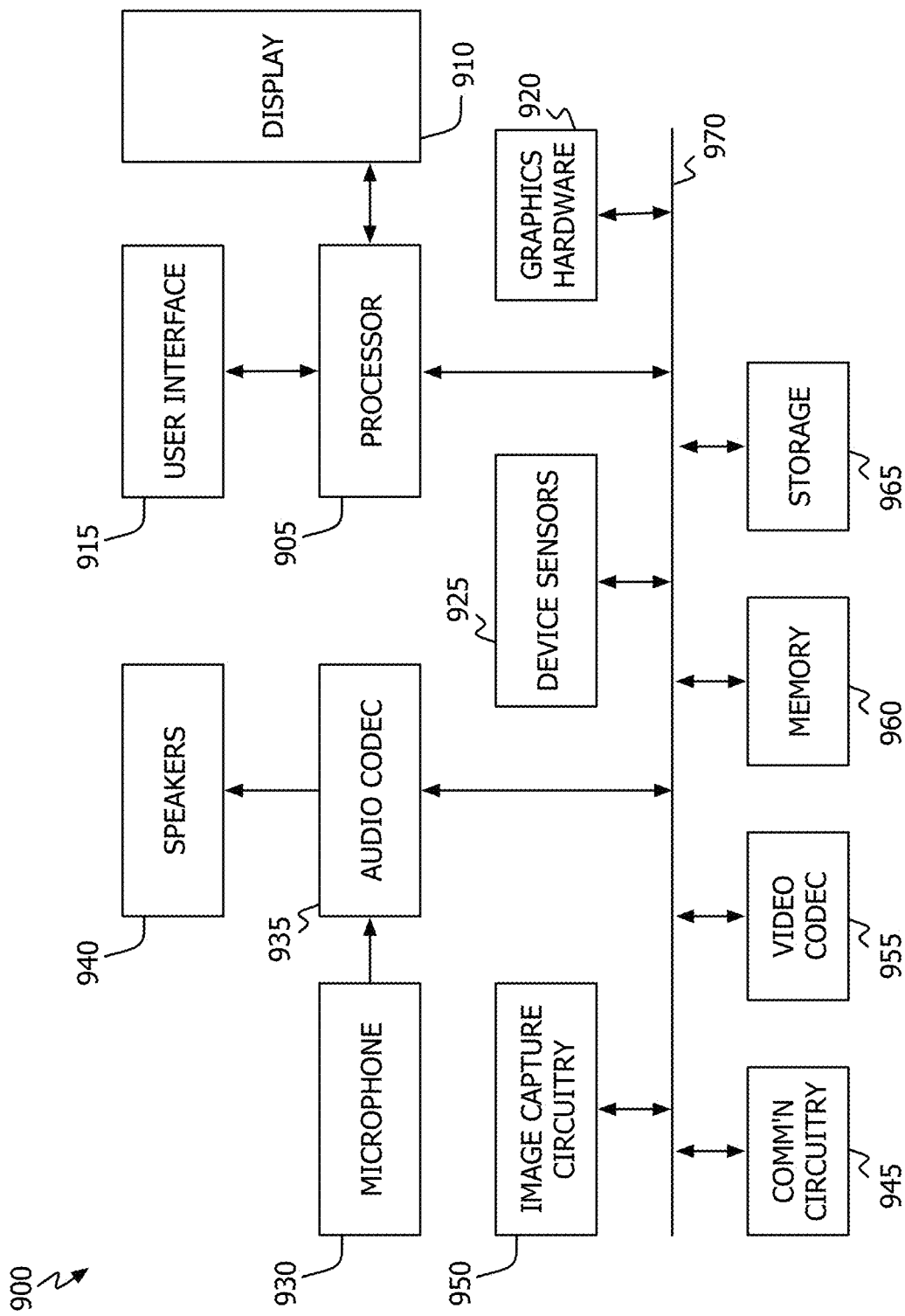
FIG. 9 shows, in block diagram form, an electronic device in accordance with one embodiment.

Referring to FIG. 9, a simplified functional block diagram of illustrative electronic device 900 is shown according to one embodiment. Electronic device 900 could be, for example, a mobile telephone, personal media device, portable camera, or a tablet, notebook or even a desktop computer system. As shown, electronic device 900 may include processor 905, display 910, user interface 915, graphics hardware 920, device sensors 925 (e.g., 3D depth sensor, proximity sensor, ambient light sensor, accelerometer and/or gyroscope), microphone 930, audio codec(s) 935, speaker(s) 940, communications circuitry 945, image capture circuit or unit 950, video codec(s) 955, memory 960, storage 965, and communications bus 970. Processor 905, graphics hardware 920, device sensors 925, microphone 930, communications circuitry 945, memory 960, storage 965, and communications bus 970 provide can provide the same function as do similarly named elements in FIG. 8. Image capture circuitry 950 may capture still and video images that may be processed in accordance with FIGS. 1-6. More specifically, output from image capture circuitry 950 may be processed, at least in part, by video codec(s) 955 and/or processor 905 and/or graphics hardware 920, and/or a dedicated image processing unit incorporated within circuitry 950 (e.g., an image processing pipeline) to provide the functionality disclosed herein.

While computer system 800 has been shown with fewer elements than portable device 900 (e.g., image capture unit 950 and video codecs 955), this need not be the case. For example, computer system 800 may have all the functional elements of device 900 including a touch interface provided by display 910 and user interface 915. In another embodiment, computer system 800 has more functional elements than device 900 such as a dedicated vector processing unit (not shown). In still another embodiment, computer system 800 has fewer functional elements than device 900. For example, computer system 800 may not include image capture or video codec functionality.

It is to be understood that the above description is intended to be illustrative, and not restrictive. For example, in the above histograms have been described as be constructed from very small portions of a larger digital image. For example, a 90×90 pixel region from an image that may be 3,264×2,548 pixels (8 Mp image). Similarly, pixel down-sampled pixel regions have been described as square. Neither of these constraints are necessary for an implementation. While discussed above, it is again noted that object tracking operation 100 as set forth in FIG. 1 does not need to incorporate a test or the ability to adapt as descried with respect to block 125. Further, overscan region 405A need not be expanded equally in both the horizontal and vertical directions as disclosed. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). In one or more embodiments, one or more of the steps disclosed in FIGS. 1-7 may be omitted, repeated, combined and/or performed in a different order than that described herein. Accordingly, the specific arrangement of steps or actions shown in FIGS. 1-5 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An object tracking method, comprising:
   receiving an initial frame from a temporal sequence of frames, the initial frame having an initial region-of-interest (ROI), the initial ROI having an initial location and an initial size;
   determining an initial histogram and an initial luminance measure based on the initial ROI;
   receiving a first frame from the temporal sequence of frames, the first frame arriving later in the temporal sequence of frames than the initial frame;
   determining a plurality of putative ROIs for the first frame, each putative ROI based on the initial histogram and the initial luminance measure;
   determining a plurality of quality metric values, each quality metric value corresponding to a different one of the putative ROIs;
   selecting one of the putative ROIs as a first ROI for the first frame based on the quality metric values;
   obtaining a first histogram and a first luminance measure based on the first ROI;
   receiving a next frame from the temporal sequence of frames, the next frame arriving later in the temporal sequence of frames than the first frame; and
   determining a next ROI of the next frame based on the first ROI, the first histogram, and the first luminance measure.

2. The method of claim 1, wherein the initial ROI comprises less than the entire initial frame.

3. The method of claim 2, wherein determining an initial histogram and an initial luminance measure comprises:
   identifying an initial portion of the initial ROI, the initial portion being less than all of the initial ROI; and
   determining the initial histogram and the initial luminance measure based on the initial portion.

4. The method of claim 3, wherein the initial portion is centered about the initial location.

5. The method of claim 4, wherein identifying an initial portion further comprises down-sampling the initial portion before determining the initial histogram and the initial luminance measure.

6. The method of claim 5, wherein determining a plurality of putative ROIs comprises, for each putative ROI:
   identifying a temporary portion of the first frame corresponding to the initial ROI;
   enlarging the temporary portion to a larger temporary portion;
   down-sampling the larger temporary portion;
   determining a temporary histogram based on the down-sampled larger temporary portion;
   determining a temporary luminance measure based on the down-sampled larger temporary portion; and
   determining the putative ROI based on the initial histogram, the temporary histogram, the initial luminance measure, and the temporary luminance measure.

7. The method of claim 6, wherein each quality metric value is based on a size and a location of the corresponding putative ROI.

8. The method of claim 1, wherein each of the putative ROIs comprises a different portion of the first frame, each of the different portions being centered about the initial location.

9. A digital image capture unit, comprising:
   an image sensor;
   a lens system configured to focus light from a scene onto the image sensor;
   a memory communicatively coupled to the image sensor and configured to store multiple images from the image sensor; and
   one or more processors coupled to the lens system and the memory, the one or more processors configured for
   causing the image sensor and memory to capture a temporal sequence of images,
   obtaining an initial image from the temporal sequence of images, the initial image having an initial region-of-interest (ROI), the initial ROI having an initial location and an initial size,
   determining an initial histogram and an initial luminance measure based on the initial ROI, obtaining a first image from the temporal sequence of images, the first image captured later in the temporal sequence of images by the image sensor than the initial image, determining a plurality of putative ROIs for the first image, each putative ROI based on the initial histogram and the initial luminance measure, determining a plurality of quality metric values, each quality metric value corresponding to a different one of the putative ROIs, selecting one of the putative ROIs as a first ROI for the first image based on the quality metric values, determining a first histogram and a first luminance measure based on the first ROI, obtaining a next image from the temporal sequence of images, the next image arriving later in the temporal sequence of images than the first image, and determining a next ROI of the next image based on the first ROI, the first histogram, and the first luminance measure.

10. The digital image capture unit of claim 9, wherein the initial ROI comprises less than the entire initial image.

11. The digital image capture unit of claim 10, wherein determining an initial histogram and an initial luminance measure comprises:

identifying an initial portion of the initial ROI, the initial portion being less than all of the initial ROI; and determining the initial histogram and the initial luminance measure based on the initial portion.

12. The digital image capture unit of claim 11, wherein the initial portion is centered about the initial location.

13. The digital image capture unit of claim 12, wherein identifying an initial portion further comprises down-sampling the initial portion before determining the initial histogram and the initial luminance measure.

14. The digital image capture unit of claim 13, wherein determining a plurality of putative ROIs comprises, for each putative ROI:

identifying a temporary portion of the first image corresponding to the initial ROI;

enlarging the temporary portion to a larger temporary portion;

down-sampling the larger temporary portion;

determining a temporary histogram based on the down-sampled larger temporary portion;

determining a temporary luminance measure based on the down-sampled larger temporary portion; and determining the putative ROI based on the initial histogram, the temporary histogram, the initial luminance measure, and the temporary luminance measure.

15. The digital image capture unit of claim 14, wherein each quality metric value is based on a size and a location of the corresponding putative ROI.

16. The digital image capture unit of claim 9, wherein each of the putative ROIs comprises a different portion of the first image, each of the different portions being centered about the initial location and comprised of an area no greater than the initial ROI.

17. A non-transitory program storage device comprising instructions stored thereon to cause one or more processors to:

receive an initial frame from a temporal sequence of frames, the initial frame having an initial region-of-interest (ROI), the initial ROI having an initial location and an initial size;

determine an initial histogram and an initial luminance measure based on the initial ROI;

receive a first frame from the temporal sequence of frames, the first frame arriving later in the temporal sequence of frames than the initial frame;

determine a plurality of putative ROIs for the first frame, each putative ROI based on the initial histogram and the initial luminance measure;

determine a plurality of quality metric values, each quality metric value corresponding to a different one of the putative ROIs;

select one of the putative ROIs as a first ROI for the first frame based on the quality metric values;

obtain a first histogram and a first luminance measure based on the first ROI;

receive a next frame from the temporal sequence of frames, the next frame arriving later in the temporal sequence of frames than the first frame; and determine a next ROI of the next frame based on the first ROI, the first histogram, and the first luminance measure.

18. The non-transitory program storage device of claim 17, wherein the initial ROI comprises less than the entire initial frame.

19. The non-transitory program storage device of claim 18, wherein the instructions to determine an initial histogram and an initial luminance measure comprise instructions to:

identify an initial portion of the initial ROI, the initial portion being less than all of the initial ROI; and determine the initial histogram and the initial luminance measure based on the initial portion.

20. The non-transitory program storage device of claim 19, wherein the initial portion is centered about the initial location.

21. The non-transitory program storage device of claim 20, wherein the instructions to identify an initial portion further comprise instructions to down-sample the initial portion before determining the initial histogram and the initial luminance measure.

22. The non-transitory program storage device of claim 21, wherein the instructions to determine a plurality of putative ROIs comprise instructions to, for each putative ROI:

identify a temporary portion of the first frame corresponding to the initial ROI;

enlarge the temporary portion to a larger temporary portion;

down-sample the larger temporary portion;

determine a temporary histogram based on the down-sampled larger temporary portion;

determine a temporary luminance measure based on the down-sampled larger temporary portion; and determine the putative ROI based on the initial histogram, the temporary histogram, the initial luminance measure, and the temporary luminance measure.

23. The non-transitory program storage device of claim 22, wherein each quality metric value is based on a size and a location of the corresponding putative ROI.

24. The non-transitory program storage device of claim 17, wherein each of the putative ROIs comprises a different portion of the first frame, each of the different portions being centered about the initial location.

* * * * *